United States Patent [19]
Weigand

[11] Patent Number: 5,837,903
[45] Date of Patent: Nov. 17, 1998

[54] DEVICE FOR MEASURING EXHAUST FLOWRATE USING LAMINAR FLOW ELEMENT

[75] Inventor: Jack Weigand, Lakewood, Ohio

[73] Assignee: The Scott Fetzer Company Inc., Westlake, Ohio

[21] Appl. No.: 532,440

[22] Filed: Sep. 22, 1995

[51] Int. Cl.$^6$ ........................................ G01F 1/34
[52] U.S. Cl. ................ 73/861.42; 73/117.3; 364/431.03; 702/47
[58] Field of Search ............................ 73/861.42, 861.52, 73/118.1, 23.31, 23.32, 118.2, 30.02, 54.01, 117.3; 364/510, 431.03, 431.06; 250/343; 702/47

[56] References Cited

U.S. PATENT DOCUMENTS

| | | | |
|---|---|---|---|
| 1,759,239 | 5/1930 | Morrison | 73/861.52 |
| 2,212,186 | 8/1940 | Ricardo et al. | 73/861.52 |
| 3,250,469 | 5/1966 | Colston | 73/861.52 |
| 3,349,619 | 10/1967 | Millar | 73/205 |
| 3,685,355 | 8/1972 | Debaun | 73/312 |
| 3,733,900 | 5/1973 | Debaun | 73/212 |
| 3,838,598 | 10/1974 | Tompkins | 73/861.52 |
| 3,840,051 | 10/1974 | Akashi et al. | 138/37 |
| 4,015,473 | 4/1977 | Kleuters et al. | 73/861.52 |
| 4,030,351 | 6/1977 | Smith | 73/188.1 |
| 4,118,973 | 10/1978 | Tucker et al. | 73/55 |
| 4,324,184 | 4/1982 | Sullivan | 104/279 |
| 4,328,780 | 5/1982 | Andrew | 73/23.32 |
| 4,379,402 | 4/1983 | Harman, III | 73/23.2 X |
| 4,412,449 | 11/1983 | Eiermann et al. | 73/204 |
| 4,433,576 | 2/1984 | Shih et al. | 73/204 |
| 4,774,833 | 10/1988 | Weibler et al. | 73/118.2 |
| 4,860,222 | 8/1989 | Schmidt et al. | 364/550 |
| 4,928,015 | 5/1990 | Butler et al. | 250/343 |
| 4,961,344 | 10/1990 | Rodder | 73/202 |
| 5,029,465 | 7/1991 | Tanimura | 73/118.2 |
| 5,040,117 | 8/1991 | Shyu et al. | 364/424.03 |
| 5,134,890 | 8/1992 | Abrams | 73/861.52 |
| 5,138,163 | 8/1992 | Butler et al. | 73/116 X |
| 5,220,830 | 6/1993 | Bonne | 73/204.4 |
| 5,249,462 | 10/1993 | Bonne | 73/204.21 |
| 5,253,517 | 10/1993 | Molin et al. | 73/118.2 |
| 5,303,584 | 4/1994 | Ogasawara | 73/704.21 |
| 5,456,124 | 10/1995 | Colvin | 73/863.11 |

FOREIGN PATENT DOCUMENTS

| | | | |
|---|---|---|---|
| 60-1522 | 1/1985 | Japan | 73/861.42 |
| 5-180670 | 7/1993 | Japan . | |
| 767047 | 1/1957 | United Kingdom | 73/861.52 |

OTHER PUBLICATIONS

Lindeburg, Michael R., PE, "Fluid Dynamics" in: Engineer-In-Training Reference Manual (California, Professional Publications, Inc., 1992), pp. 17–6.

*Primary Examiner*—George Dombroske
*Assistant Examiner*—Paul D. Amrozowicz
*Attorney, Agent, or Firm*—Ralph E. Jocke

[57] ABSTRACT

An apparatus for determining the exhaust flowrate from an internal combustion engine (112) includes a laminar flowmeter (116). The flowmeter includes a capillary section (18) of ceramic material including an array of capillary tubes. Signals from a differential pressure sensor (128) which measures pressure loss across the capillary section as well as an absolute pressure sensor (126) and a temperature sensor (130) are input to a computer (134). The computer is programmed to calculate the flowrate of exhaust gas from the engine through its operating range.

33 Claims, 7 Drawing Sheets

DEVICE FOR MEASURING EXHAUST FLOWRATE USING LAMINAR FLOW ELEMENT

TECHNICAL FIELD

This invention relates to gas flow measuring devices. Specifically, this invention relates to a system and device for measuring the exhaust flowrate from an internal combustion engine which utilizes a laminar flow element.

BACKGROUND ART

Internal combustion engine exhaust is characterized by many inherent qualities which render it difficult to accurately measure quantitatively. Typical flowmeters cannot be used to measure the exhaust flowrate because they create a backpressure which affects engine performance.

Other gas flow measuring devices are not suitable because they are incapable of operating at the high temperatures of the exhaust. The temperature of the exhaust varies from ambient to as high as 800° F. The temperature varies as the engine speed and fuel consumption rate varies. The temperature changes as the exhaust gas composition changes. The composition and temperature both affect the viscosity and density of the gas, creating inherent inaccuracy in most flowmeters.

The exhaust gas contains corrosive components as well as water. This chemical combination creates a inhospitable atmosphere for materials typically used in flowmeters. The high temperatures multiply the corrosive nature of the exhaust. The water vapor in the exhaust can also produce condensation, which may plug flowmeters and sampling lines.

The exhaust gas flowrate can vary widely. The flowrate can range from a very low level which renders it difficult to accurately measure, to a very high level. Most flow measurement devices are incapable of maintaining their sensitivity over such a wide range. Internal combustion engines can produce step changes in exhaust flowrate in time periods as short as 15 milliseconds. The exhaust flowrate often pulsates and can even reverse its flow direction. Most flowmeters are incapable of reacting to such quick flow changes, while maintaining their sensitivity.

Many devices which measure the engine intake air flowrate are known in the prior art. These devices operate satisfactorily in the ambient temperatures and innocuous chemical atmospheres of the intake air, but are not suitable for measurement of exhaust gas.

Thus there exists a need for a device and system to quantitatively measure exhaust flows from internal combustion engines and which can operate in such corrosive atmospheres while maintaining high sensitivity over a wide turndown flow range.

DISCLOSURE OF INVENTION

It is an object of the present invention to provide an apparatus for measuring exhaust flows from an internal combustion engine.

It is a further object of the present invention to provide an apparatus for measuring exhaust flows which can maintain high accuracy over a wide range of exhaust flowrates.

It is a further object of the present invention to provide an apparatus for measuring exhaust flows which maintains flow measurement accuracy over a wide temperature range characteristic of internal combustion engine exhaust.

It is a further object of the present invention to provide an apparatus for measuring exhaust flows which minimizes the backpressure in the exhaust conduit to avoid interference with internal combustion engine performance.

It is a further object of the present invention to provide an apparatus for measuring exhaust flows which is capable of accurately measuring volumetric flowrates characteristic of internal combustion engine exhaust flowrates.

It is a further object of the present invention to provide an apparatus for measuring exhaust flows which is capable of accurately reacting to and accurately measuring step changes in volumetric flowrate which are short in duration.

It is a further object of the present invention to provide an apparatus for measuring exhaust flows which can withstand the corrosive compositions and high temperatures characteristic of internal combustion engine exhaust.

It is a further object of the present invention to provide an apparatus for measuring exhaust flows which can prevent water saturated exhaust gas from condensing and interfering with precise measurement of the exhaust.

Further objects of the present invention will be made apparent in the following Best Modes For Carrying Out Invention and the appended claims.

The foregoing objects of the present invention are accomplished by an apparatus and system which includes a laminar flow element device or LFE. The LFE includes a cylindrical body which is connected to an exhaust pipe which carries the exhaust from an internal combustion engine. The LFE further includes a capillary section which is positioned within the body. A pressure drop in the exhaust is induced by the capillary section as the exhaust gas flows through the LFE. The pressure drop is measured by a pressure differential sensor which in the preferred embodiment of the invention comprises a pressure transducer positioned in fluid communication with the fluid at each end of the capillary section.

The capillary section is comprised of an array of capillary tubes, which are aligned in parallel with the longitudinal axis of the body. The aggregate area of the capillary section through which the exhaust flows is sized so that the exhaust flow therethrough is in the laminar range. This size and design of the capillary section acts to produce a very low backpressure even at high exhaust flow.

In the preferred embodiment the body is made of a material that can withstand the high temperatures and corrosive properties of the exhaust gas. The capillary section is made from a ceramic material. The low pressures produced in the gas are virtually unaffected by the thermal expansion of the body and capillary section.

The preferred embodiment of the apparatus further includes a heating element adapted to transmit heat to the body and capillary sections of the LFE. The LFE is heated by the heating element to prevent the temperature of the LFE from falling below the dewpoint of the. exhaust gas.

The apparatus further includes a pressure sensing element positioned to measure the pressure of the exhaust entering the capillary section, and a temperature sensing device positioned to measure the temperature of the exhaust entering the capillary section. The pressure sensing element, the temperature sensing element and the pressure differential sensor produce signals which are input to a computer. The computer samples the signals from the sensors and uses the readings to calculate the volumetric flowrate of the exhaust.

BEST MODES FOR CARRYING OUT INVENTION

Figure 1:
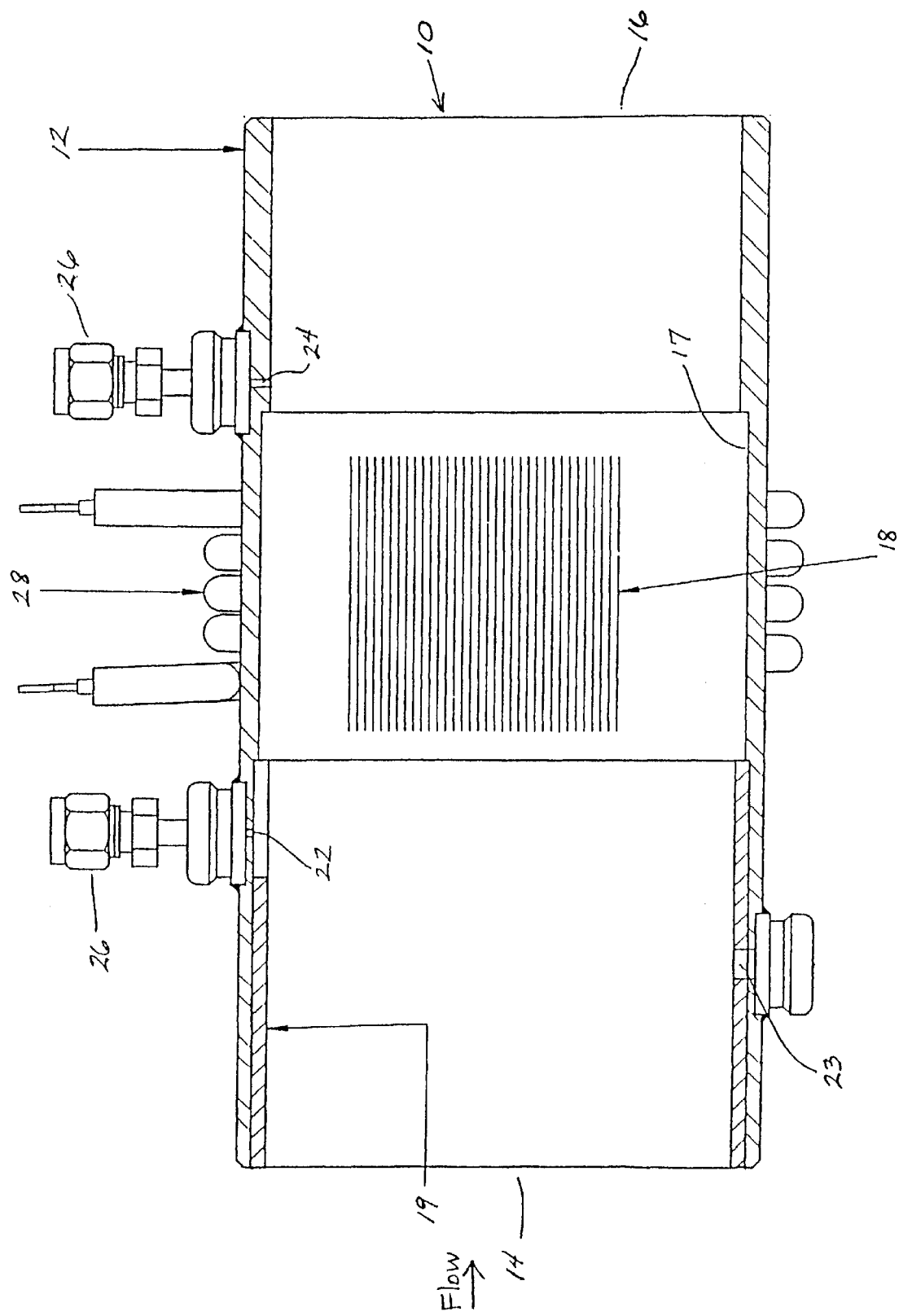
FIG. 1 is a cross-sectional view of a laminar flow element device of the present invention.

Referring now to the drawings, particularly to FIG. 1, there is shown therein, a laminar flow element device or flowmeter 10 used in the preferred form of the present invention. Laminar flowmeter 10 includes a cylindrical body 12. The body 10 is made of a material that can withstand the high temperature and exhaust gas corrosive properties. In the preferred embodiment of the invention the body is manufactured from stainless steel. Alternatively nickel alloys may be used. The body 10 accepts the exhaust from an engine at an exhaust inlet 14. Clamps or high temperature hose connections known to those skilled in the art can be used to connect the exhaust inlet to the exhaust pipe or other conduit through which exhaust flows from the engine. The body 12 also has an exhaust outlet 16 which provides an outlet connection to the rest of the exhaust system.

Figure 2:
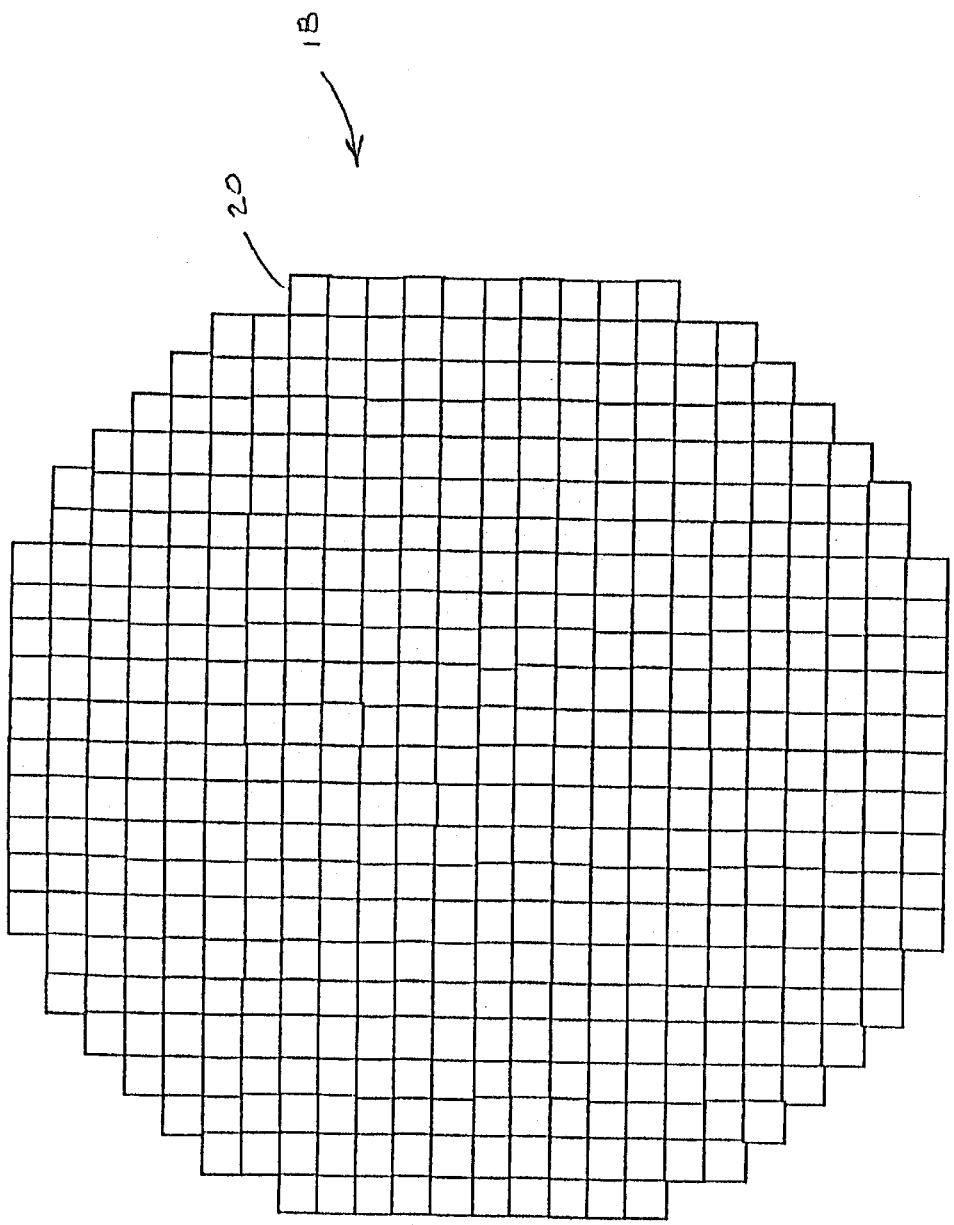
FIG. 2 is a partial view of the square shaped capillary tubes of the capillary section of the laminar flow element device.

Laminar flowmeter 10 also includes a capillary section 18. The capillary section 18 consists of an array of ceramic capillary tubes. These tubes are shown in cross section in FIG. 2. Each parallel tube 20 is square in cross section with an open internal area of preferably about 0.05 by 0.05 inches and extends traverse to the direction of exhaust flow. The aggregate open internal area of the array is preferably about 72 percent relative to the interior area of the body. The length between the inlet and outlet of the capillary section is preferably about three inches. Each tube has a hydraulic diameter of about 1.27 millimeters and is individually sufficiently large to minimize potential blockage due to exhaust gas particles. The tube size is selected to produce a differential pressure, which is a permanent pressure loss, which minimizes the exhaust backpressure. This small differential pressure minimizes the effect of the flowmeter on engine performance.

The capillary section 18 is rigidly secured inside body 12. Capillary section 18 nests precisely in a pocket 17 formed in the interior of body 12. The capillary section is held in place by a sleeve 19. This rigidity insures geometric integrity and accuracy and repeatability of the relationship between volumetric flowrate and differential pressure. This construction also prevents flow bypass around the capillary section. Because the laminar flowmeter is a mechanically rigid unit, it does not change calibration with cleaning or proper handling. As explained later in detail, by maintaining close machining tolerances for the body, high accuracy, including repeatability of plus or minus two percent of readings for a 10:1 turndown flowrate are attainable.

The body 12 also includes sensing ports to detect the pressure adjacent to the inlet and outlet of the capillary section 18. The sensing ports are also utilized to measure line static pressure. A first sensing port 22 is preferably about 1.5 millimeters in diameter and extends perpendicular to a longitudinal axis of body 10. Port 22 is also located adjacent to an inlet plane of the openings in capillary section 18. A second sensing port 24 is similarly sized and also positioned perpendicular to the body's longitudinal axis. Port 24 is positioned adjacent to an outlet plane of the openings of the capillary section. Both sensing ports are fluidly connected to secondary readout devices with coupling and reducer assemblies 26.

The capillary section is preferably comprised of ceramic material. Ceramic material provides desirable resistance to the corrosive properties of the exhaust gas and resistance to high temperatures. The high temperatures of the exhaust gas do not affect the dimensions of the ceramic capillaries because of the inherent properties of the refractory material.

The laminar flowmeter 10 further includes a heating element 28. The heating element 28 extends in coiled fashion about the exterior of the body 12. The heating element preferably is of the electrical-resistance type and is positioned centrally on the body to transmit heat into the interior of the body and into the capillary section. The heating element 28 is preferably operated under the control of appropriate electrical control circuitry. The heating element is operated in response to a thermocouple or other temperature sensing device which is mounted through port 23 of body 12. The heater operates to maintain the interior of the laminar flowmeter at a predesignated minimum temperature. Although the electrical-resistive heating element is preferred because of its low costs and operating capabilities, other suitable heating elements could alternatively be used. In the preferred form of the invention the heating element is covered externally by an insulating cover (not shown) to minimize heat loss and avoid burns to individuals who may come in contact with the device.

The laminar flowmeter uses the principle of flow through a capillary tube to determine the volumetric flowrate of gas. The principles of capillary flow were developed by Poiseuille and Hagan. The Hagan-Poiseuille Law relates the fluid actual volumetric flow through a capillary tube to the differential pressure across the capillary tube. This relationship is:

$$\Delta P = \frac{A Q \mu L}{D^4} + B \rho Q^2$$

where:

$\Delta P$=differential pressure across the capillary tube,

A=constant,

Q=actual volumetric flowrate, $\mu$=absolute viscosity,

L=capillary length,

D=capillary diameter,

B=constant, $\rho$=density of the flowing fluid.

The Hagan-Poiseuille Law was derived assuming a constant property, fully developed laminar flow. Most laminar flowmeters have a non-linearity of five percent or less over their normal 10:1 turndown flow range. To account for this non-linearity an expanded quadratic form of the Hagan-Poiseuille equation is:

$$\frac{\Delta P}{Q\mu} = A + B\left(\frac{\rho Q}{\mu}\right) + C\left(\frac{\rho Q}{\mu}\right)^2$$

where:

C=a constant.

This equation relates the volumetric flow to the differential pressure in a more representative fashion for laminar flowmeter performance. This equation can be used to determine what pressure differential would be generated for a given flow rate Q.

The design of the ceramic laminar flowmeter enables the total pressure that is lost as the exhaust gas passes through the laminar flowmeter to be less than two inches of water. Because of the low pressure loss, the gas stream can be treated as a compressible. It is therefore possible to rearrange the equation in a quadratic or cubic least square fit relationship:

$$\frac{Q\mu}{\Delta P} = A + B\left(\frac{\rho\Delta P}{\mu^2}\right) + C\left(\frac{\rho\Delta P}{\mu^2}\right)^2 + D\left(\frac{\rho\Delta P}{\mu^2}\right)^3$$

where:

A, B, C, D=constants determined by calibration data of each individual laminar flowmeter. This equation allows for the calculation of the flowrate for a known $\Delta P$.

The flow in the exhaust pipe connected to the inlet of the body 12 may be turbulent, transitional, or laminar. However the proper sizing of the laminar flowmeter assures that the flow is laminar through the capillary section of the flowmeter. A laminar flowmeter is sized properly when the Reynolds number of the gas of the exhaust flow is less than or equal to 37.5 times the $\Delta P$ through the capillary section of the laminar flowmeter, where the Reynolds number equals:

$$Re = \frac{228 Sg P \Delta P}{\mu}$$

Re=Reynolds number,

Sg=specific gravity of the flowing exhaust,

P=line pressure of the exhaust in inches of mercury, $\Delta P$=differential pressure generated by the capillary section at flowing conditions in inches of water, and $\mu$=absolute viscosity of the flowing gas in micropoise.

When the Reynolds number is greater than 37.5 times the $\Delta P$, the flowrate to differential pressure relationship will not be linear. However, if the laminar flowmeter is calibrated at the operating conditions, the calibration is useable and repeatable.

Figure 3:
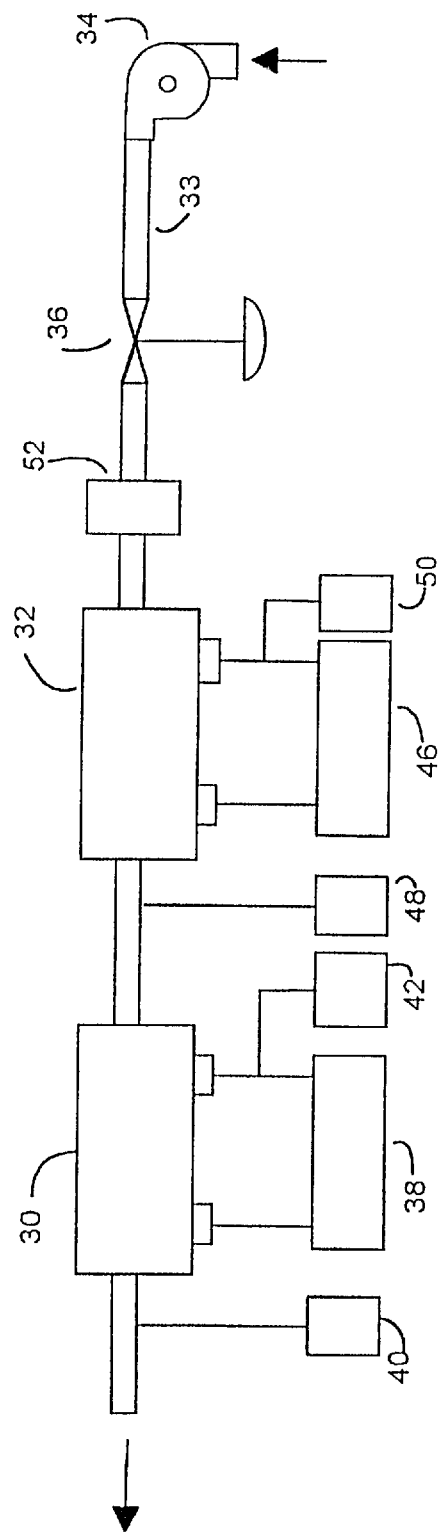
FIG. 3 is a schematic view of the manual calibration system using a laminar flow element device.

The calibration of a laminar flowmeter is possible. FIG. 3 shows a typical manual calibration setup. A precalibrated laminar flow element device 30 which has a laminar flow element that has been calibrated with instruments traceable to the National Institute of Science and Technology, is placed in a closed conduit 33 in series with a laminar flow element 32 to be tested. Air or other gas is supplied by a blower 34. Alternatively a compressor or pressurized gas source could be used as the gas supply. The volumetric concentration of the gas must be known for purposes of calculating both the viscosity and the density of the gas. A flow control valve 36 is used to regulate the flow of the blower 34. The to-be-tested laminar flow element is placed downstream of the control valve 36. Instrumentation, including a manometer 38, a thermometer 40 and a barometer 42 is attached to the precalibrated laminar flow element device 30. Likewise a manometer 46, a thermometer 48 and a barometer 50 are attached to the laminar flow element device to be tested. Finally a filter and/or separator 52 is placed upstream of both laminar flow elements to prevent contaminants from entering and plugging the capillary sections of the laminar flow elements.

The parameters required to determine gas flowrate through the laminar flow element devices are the differential pressure across the laminar flow element, the inlet absolute static pressure and the exit fluid temperature. A micromanometer is preferably used to measure the differential pressure. An absolute barometer is preferably used to measure the static pressure, and a half-degree graduated thermometer is preferably used to measure the fluid temperature.

Although a laminar flow element device can accept a large turndown, its accuracy and turndown are limited by the accuracy of the measuring device available for low differential pressures. Laminar flow elements will produce a maximum differential pressure of 8 inches of water. At a 10:1 turndown, a readout device must be capable of measuring 0.8 inches of water to within plus or minus 0.002 inches of water to achieve an accuracy of plus or minus 0.25 percent. Until very recently, the only device capable of these accuracies was a micromanometer.

With the manual calibration system assembled, the laminar element device can be calibrated. A constant flowrate is first established through the conduit, and the readings of manometers 38 and 46, thermometers 40 and 48 and barometers 42 and 50 are taken and recorded. These readings are similarly taken after the flowrate has been adjusted over increments throughout the desired range. The recorded data is then used to regress the calibration constants A, B, C, D. These calibration constants can then be used in the calculation of volumetric flowrate when using the now calibrated laminar flow element. This manual method of calibration is a tedious and time-consuming task. Calibration becomes especially cumbersome when the temperature of the gas flowing through the conduit changes over the course of the test. The changing temperature requires the adjustment in readings of the barometer and micromanometer.

Figure 4:
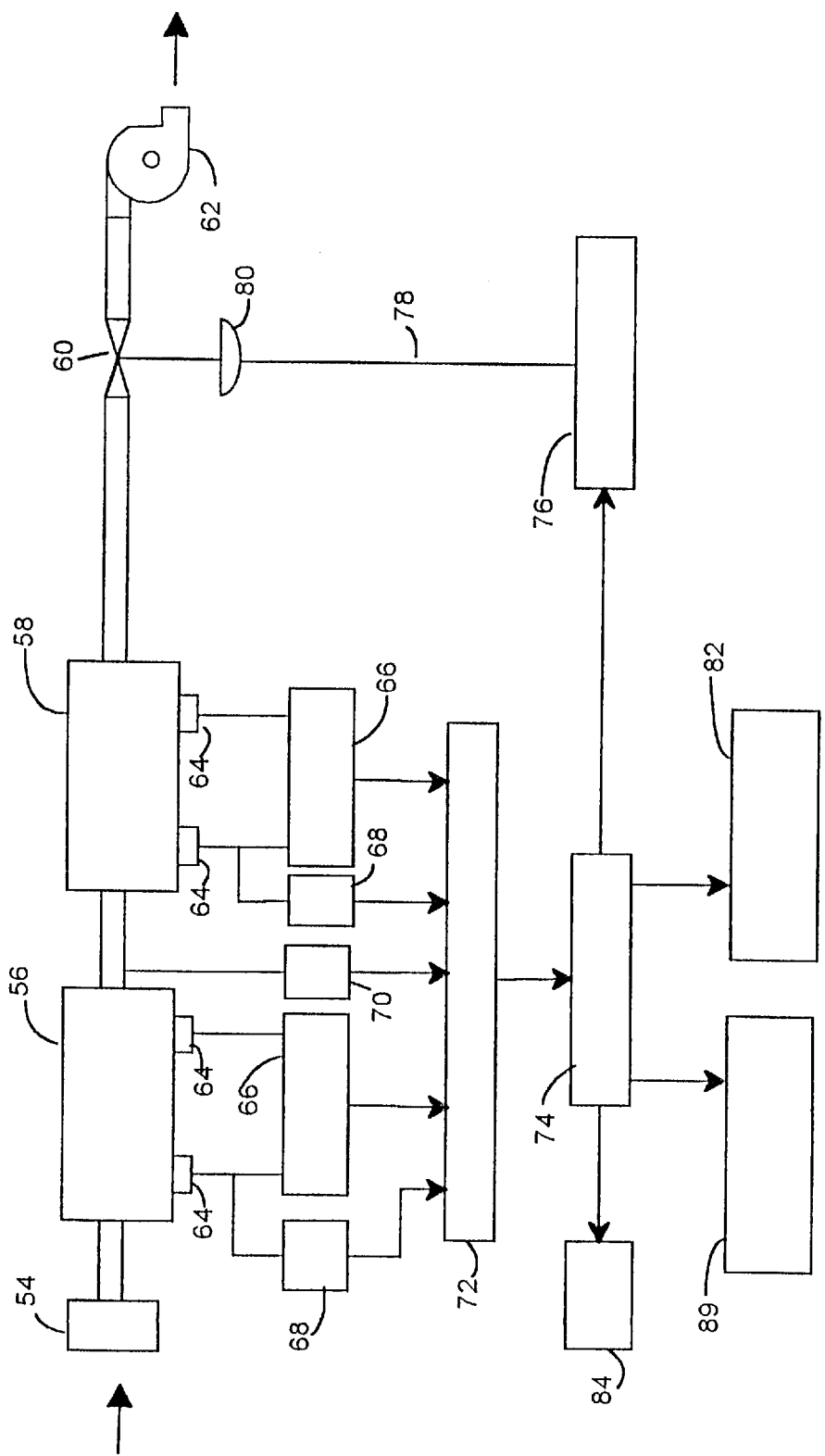
FIG. 4 is a schematic of a computer controlled calibration system using a laminar flow element device.

Because of the problems associated with the manual method of calibration, a computerized calibration system is the preferred method. The computer controlled calibration system is coupled with a data acquisition control system. This type of system can provide the benefits of proven system accuracy, reduced calibration time, and condensed permanent data storage. Such a system is shown in FIG. 4. The calibration train consists of a prefilter 54, the to-be-tested laminar flow element device 56, the precalibrated laminar flow element device 58, a programmable flow control valve 60 and a blower 62. The system alternatively can include a source of pressurized gas of a known volumetric concentration. The absolute pressure and differential pressures cross the capillary sections of each LFE are sensed through the LFE sensing ports 64. The system includes for each LFE a differential pressure transducer 66 and an absolute pressure transducer 68. Preferably the absolute pressure transducer is a digital gauge such as Meriam Instrument Model AN0030PA and the differential pressure transducer is a capacitance sensor made by MKS Model 220CD. The system further includes a temperature sensor 70 which is preferably a one hundred ohm resistance temperature device (RTD) with transmitter. The analog signals are passed through an analog to digital (A/D) converter 72 which outputs digital signals to a computer 74.

The data acquisition control system comprises the computer 74 and the analog to digital converter 76. The computer includes a real time clock which enables it to calculate intervals of time. The start and stop times are operatively input into the computer and the real time clock allows the computer to assign a time to all data input, relative to these two times.

The computer 74, is preferably programmed so the calibration system may perform an entire calibration at an operator's command. With a programmed input of the maximum flow to be calibrated, the system can perform a 10-point calibration by incrementing flow every one-tenth of full scale. The flow is adjusted by the control valve 60 under the control of the computer via a digital to analog (D/A) converter 76 which outputs a variable pressure 3–15 PSIG signal on a line 78 to a pneumatic actuator 80 of the flow control valve 60. At each increment the computer will first allow the system to balance for several seconds as required. The computer will then scan the inputs to store the data for later use. The data can be stored in the memory 82 associated with the computer, which can be a floppy disk, hard drive or EPROM. At the completion of the test sequence, the computer will perform the necessary calculations and save the results to disk storage and/or on a data printer 84.

Figure 5:
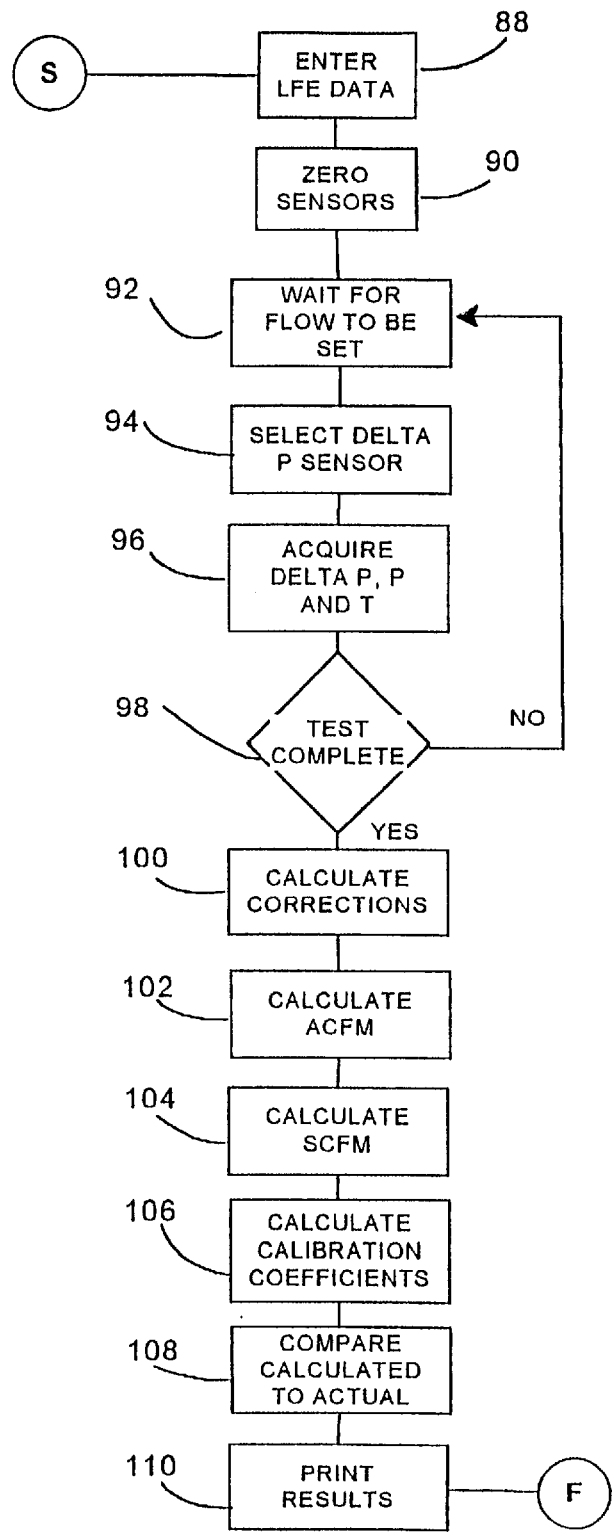
FIG. 5 is a flow diagram for a computer controlled calibration system shown in FIG. 4.

FIG. 5 shows a computer controlled calibration system flow diagram. At the start of the calibration, the operator enters the model number, the serial number and calibration information for both the LFE to be tested and the precalibrated LFE 88 via a keyboard (see FIG. 4) 89. The computer then zeros the sensors 90, and waits for the operator to set the flow calibration point 92. After the point is set, the computer selects a proper sensor 94 and samples the differential pressure, line pressure, and temperature at step 96. This data is stored until the test is complete as determined through decision point 98.

A preferred calibration approach uses eight flow points. At the completion of the test, the Reynolds number, viscosity and density are calculated at step 100. The results of these calculations are used to calculate the actual flowrate in cubic feet per minute at step 102. The pressure and temperature data are then used to calculate the standard flowrate at step 104.

The computer then regresses the calculated data and calculates the calibration coefficients using the appropriate quadratic or cubic equations at step 106. The computer then compares the actual results to an assemblage of calculated results at step 108 and prints out the results as a calibration sheet at step 110. The flowrate through the tested laminar flowmeter device can then be calculated by using the coefficients supplied in the calibration sheet.

Figure 6:
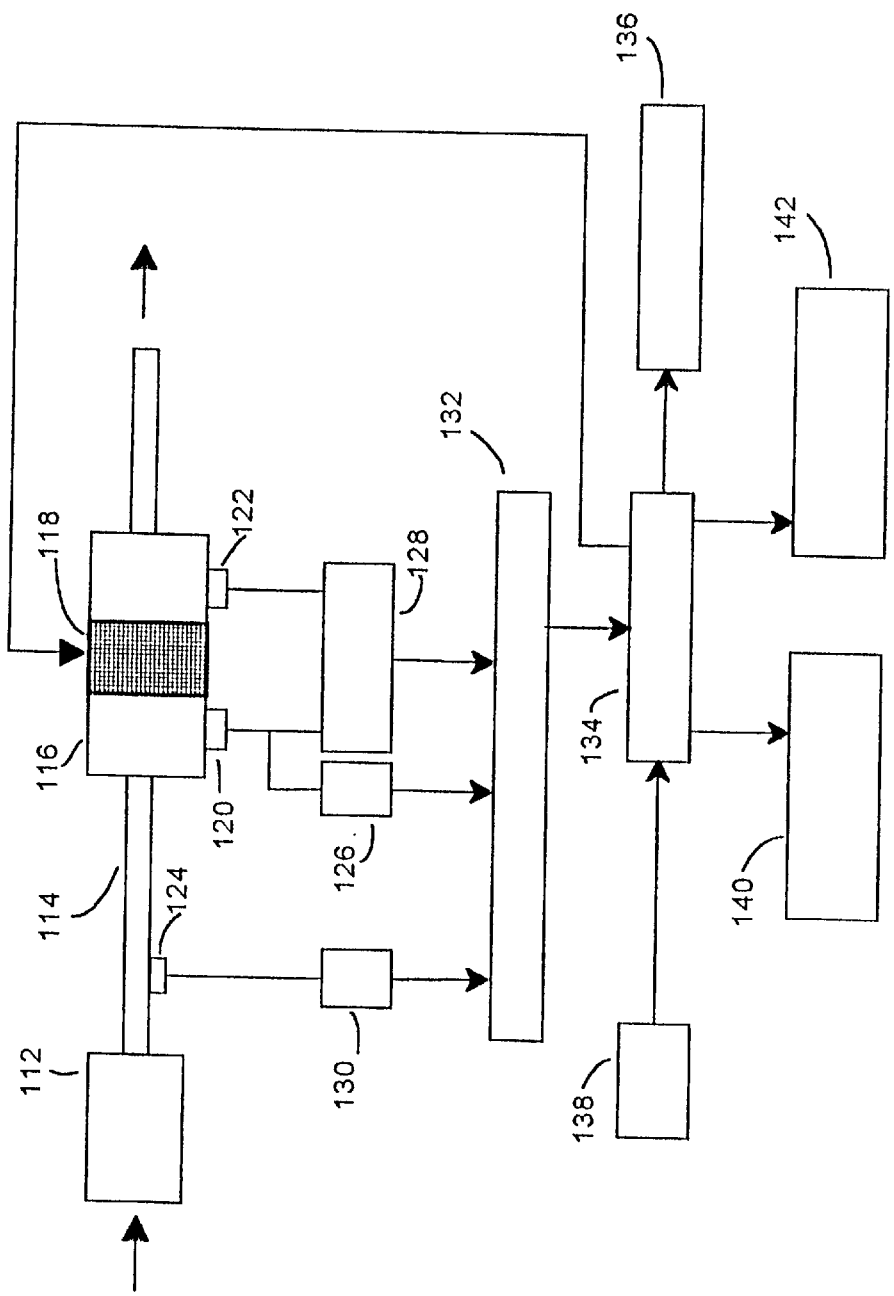
FIG. 6 is a schematic of a computer controlled apparatus for measuring exhaust flowrate using the laminar flow element device.

FIG. 6 schematically depicts a system for measuring the exhaust flowrate from an internal combustion engine using a laminar flow element device. The engine 112 is supported on a test stand and is supplied with fuel and air in the conventional manner. The products of combustion from the engine flow via an exhaust pipe 114 to a laminar flowmeter 116. Alternatively, the laminar flowmeter can be in fluid communication with the exhaust using a heat-resistant conduit extending from the exhaust pipe and the laminar flowmeter 116. The exhaust flows to the atmosphere through the closed conduit consisting of the exhaust pipe and the laminar flowmeter.

The temperature of the laminar flow element is maintained via a heating element 118 at a predetermined elevated temperature. This elevated minimum temperature is preferably maintained at about 150° F. prior to engine start to avoid condensation of water vapor in the device. As discussed hereafter, the power input to the heating element is controlled by the computer to heat the device only to the extent necessary to avoid condensation therein.

Exhaust pressure information is sensed through an upstream sensing port 120 positioned before the capillary section of the laminar flowmeter and a downstream sensing port 122 positioned after the capillary section. The temperature information of the exhaust is obtained from a thermocouple sensing port 124 positioned upstream of the laminar flowmeter. Absolute pressure is measured at the upstream sensing port using an absolute pressure transducer 126. A differential pressure transducer 128 measures the pressure differential across the capillary section via sensing ports 120 and 122. Temperature of the exhaust gas entering the laminar flowmeter is sensed using a temperature sensor 130 positioned in the thermocouple sensing port 124.

The three sensors 126, 128 and 130 produce analog signals which are input to an analog to digital converter 132 and then to a computer 134. The computer also receives information from a memory 136 and from an operator input via a keyboard 138. The computer can transmit results via a printer 140 and a monitor 142. The computer in some embodiments also operates the control circuitry to control the heat transmission rate of the heating element 118 and thereby controls the temperature of the laminar flowmeter 116.

The apparatus is specifically designed to measure the engine exhaust flowrate. Several characteristics of engine exhaust gas and its flow make it difficult to measure the flowrate directly. The exhaust gas changes composition over time. The temperature of the gas varies from ambient, which can be as low as –20° F. to approximately 800° F. at full engine throttle. The exhaust flow pulsates and may actually reverse its direction. All of these characteristics must be accounted for in measuring the exhaust gas flowrate.

The absolute viscosity has a direct effect on the measurement of flowrate. The absolute viscosity of exhaust gas changes with its composition and temperature. Therefore, in order to measure real time flowrate, an exhaust gas composition model must be generated. This model depends on engine type, engine size and time. The viscosity of the engine exhaust gas can be calculated at various temperatures using the formula:

$$\mu_{mix} = \frac{\sum_i \mu_i Y_i M_i^{\frac{1}{2}}}{\sum_i Y_i M_i^{\frac{1}{2}}}$$

where $\mu_{mix}$=absolute viscosity of exhaust gas, $\mu_i$=absolute viscosity of the in component of exhaust gas, $Y_i$=percent volume of the $i^{th}$ component of exhaust gas, and $M_i$=the molecular weight of the $i^{th}$ component of the exhaust gas.

This absolute viscosity information is stored in the memory of the computer and used to calculate flowrate.

The density of the exhaust gas also directly affects the calculation of flowrate and is dependant upon exhaust gas composition. The density can be calculated using the formula:

$$\rho_{mix} = 2.6988 \frac{\left(\sum_i Y_i M_i\right)}{28.692} \left(\frac{P}{T}\right)$$

where:

$\rho_{mix}$=density of the exhaust gas at operating conditions, $Y_i$=volume percentage of the $i^{th}$ component of the exhaust gas, $M_i$=molecular weight of the $i^{th}$ component of exhaust gas, 28.962=molecular weight of air, P=absolute line pressure, and T=absolute line temperature.

This density information is stored in the memory of the computer to calculate flowrate.

As the laminar flowmeter converts the velocity profile of the exhaust into a differential pressure, it responds to step changes in flowrates in about 10–15 milliseconds. Therefore, the differential pressure sensor must respond as quickly as the laminar flowmeter for accurate sampling. Other system parameters that must be measured need not react as rapidly as the pressure sensors.

In accordance with a preferred embodiment of the invention, for an engine produced by a manufacturer an exhaust gas composition model is developed which details the exhaust gas constituency. This model details the $CO_2$, CO, $O_2$, $H_2O$, $NO_x$ and hydrocarbon percent volumes as a function of real time from start to idle and at the full range of higher engine speeds. The remaining volume of exhaust gas is nitrogen. Prior to testing, a model is developed for each engine to be tested that profiles the exhaust constituency from engine start to 5 seconds, 5 seconds to 10 seconds, and so on. In many situations the volume percentages of $NO_x$ and hydrocarbons in the exhaust are so small that they do not effect the viscosity and density calculations and need not be included in the model. The model exhaust constituency data is stored in the memory of the test computer prior to testing for later data retrieval.

Figure 7:
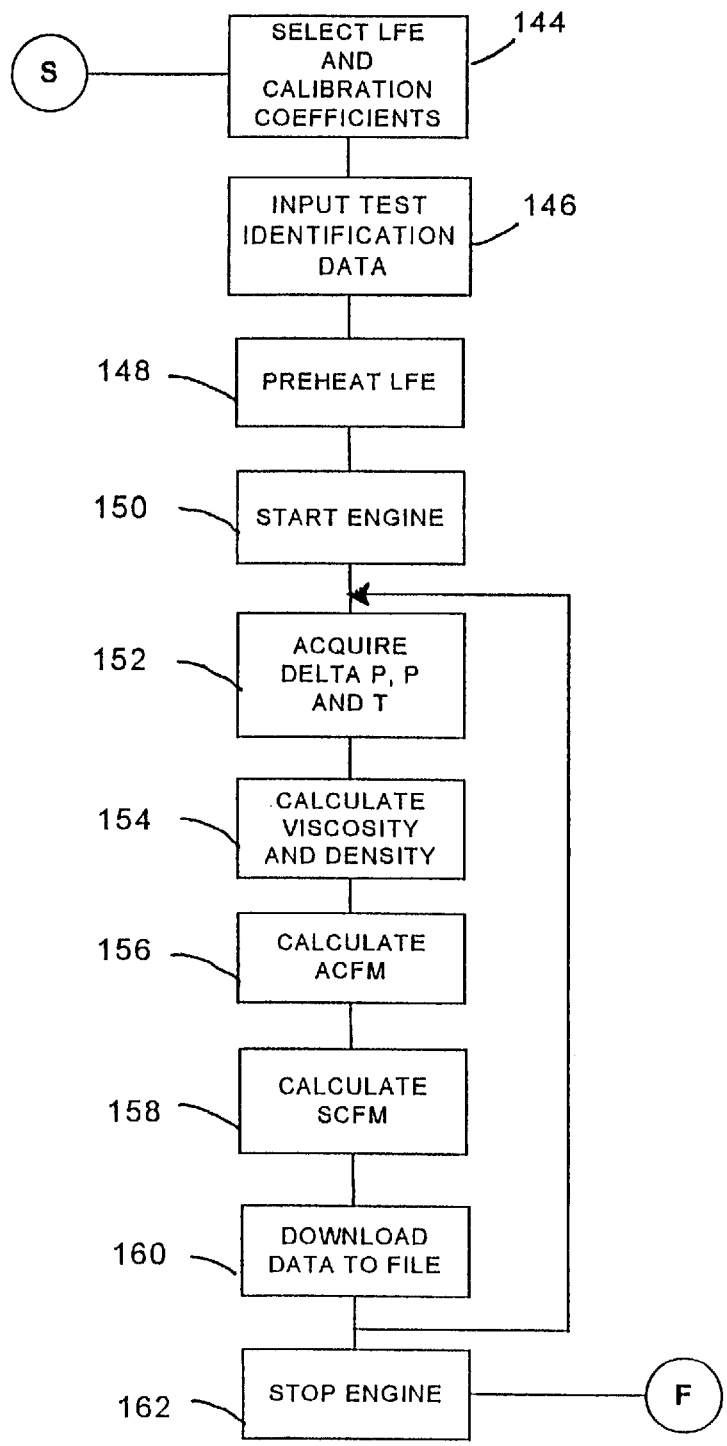
FIG. 7 is a flowchart of the computer program executed by the computer of the apparatus shown in FIG. 6.

A flowchart for the computer program executed by the apparatus in making engine exhaust flowrate measurements using a laminar flowmeter system is shown in FIG. 7. The operator is first prompted to input the LFE information into the memory of the computer and the LFE's calibration coefficients in step 144. The operator is then prompted to input the test identification data and the information regarding the engine size, fuel mix used in the engine and the duration of the test 146. This information will allow the computer to correlate the volumetric concentration of the exhaust gas in real time by retrieving the appropriate exhaust constituency model data from memory. After all the pertinent test information is input into the computer, the test can be started.

The first step in the test is the computer preheating the laminar flowmeter by sending a signal to an associated rheostatic controller 148. The controller enables electrical flow through the heating element. The computer preferably calculates the dewpoint temperature of the exhaust gas concentration for the start of the test and controls electrical flow to preheat the laminar flowmeter to a temperature which exceeds the dewpoint. This preheating is necessary to prevent the thermal inertia of the ceramic laminar flowmeter from condensing exhaust gas water which will plug and occlude the capillary tubes of the capillary section and result in inaccurate readings. Alternatively, the computer may preheat the flowmeter to a temperature that is sufficiently high to avoid condensation for all engine types and conditions. Once the computer receives a signal from circuitry associated with the thermocouple or other sensor adjacent to the heating element that the laminar flowmeter has achieved the desired temperature, the engine is started at step 150.

Once the engine is started, the sampling begins. Data for differential pressure, absolute line pressure and temperature are acquired by the computer every 20 milliseconds at step 152. With this data, the computer then calculates the viscosity and density of the exhaust gas at step 154. Every 100 milliseconds a five-point average of differential pressure, absolute pressure and temperature are used to calculate the actual volumetric flowrate at step 156. The computer calculates the standard flowrate using the actual temperature and pressure data at a step 158. The flowrate and averaged parameters are then downloaded into a file in memory at step 160.

Once the temperature signal indicates that the exhaust temperature exceeds the calculated dewpoint temperature of the exhaust gas, the computer stops electrical flow to the heating element. Alternatively the computer can compare the temperature signal to a set point for purposes of stopping external heating of the capillary section.

Steps 152 through 160 are repeated until the engine is turned off to designate the end of the test 162. The operator can then instruct the computer to print out the report or may choose to keep the report in its respective file in memory. The form of the printed report can be conformed to meet the needs of the entity conducting the test.

The preferred embodiment of the present invention enables the accurate measurement of engine exhaust flowrates under varying conditions. The low pressure drop of the LFE enables testing under conditions which closely simulate those found when the LFE is not present. The system is particularly useful in the refinement and testing of electronic engine control systems to attain desired operating parameters and optimal engine performance. The apparatus, though highly sensitive, is also sufficiently durable and tolerant of the harsh service environment to provide a long useful life.

Thus, the apparatus for measuring exhaust flowrate using a laminar flow element of the present invention achieves the above-stated objectives, eliminates difficulties encountered in the use of prior devices and systems, solves problems and attains the desired results described herein.

In the foregoing description, certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the details shown and described. Further in the following claims any feature that is described as a means for performing a function shall be construed as encompassing any means capable of performing that function and shall not be limited to the particular means shown in the foregoing description or mere equivalents.

Having described the features, discoveries and principles of the invention, the manner in which it is constructed and operated and the advantages and useful results attained; the new and useful structures, devices, elements, arrangements, parts, combinations, systems, equipment, operations and relationships are set forth in the appended claims.

I claim:

1. An apparatus for measuring the exhaust gas flowrate from an internal combustion engine comprising:

a body in fluid communication with said engine, wherein exhaust gas is enabled to flow therethrough;

a capillary section housed within said body, wherein pressure of said exhaust gas is reduced as it flows through said capillary section;

a pressure differential sensor operatively connected across said capillary section, wherein said pressure sensor outputs at least one pressure signal responsive to said pressure reduction, whereby said pressure signal is usable to calculate said exhaust gas flowrate;

a temperature sensor positioned in said exhaust gas adjacent to said capillary section, and wherein said temperature sensor outputs at least one temperature signal responsive to a temperature of said exhaust gas;

a computer, wherein said computer is in operative connection with said temperature sensor;

a clock in operative connection with said engine and said computer, wherein said clock is operative to measure an elapsed time from a start of said engine; and a memory in operative connection with said computer, wherein said memory contains data representative of said exhaust gas composition as a function of said elapsed time, and wherein said computer is operative to calculate a value corresponding to a viscosity of said exhaust gas as a function of said memory data and said temperature signal.

2. The apparatus according to claim 1 wherein said capillary section comprises an array of capillary tubes disposed in parallel with a longitudinal axis of said body, and wherein the exhaust gas flows through said tubes.

3. The apparatus according to claim 1 wherein said capillary section has an exhaust flow area extending transversely of a direction of flow through said body, and wherein said capillary section is sized so that said exhaust flow through said capillary section is laminar.

4. The apparatus according to claim 2 wherein each said capillary tube has an internal area, wherein said exhaust gas flows through said internal area of each tube, and wherein an aggregate of said internal areas of said capillary tubes is sized so that said exhaust flow through said capillary section is laminar.

5. The apparatus according to claim 1 and further comprising a heating element, and wherein the heating element maintains the temperature of the capillary section above a dewpoint temperature of said exhaust gas.

6. The apparatus according to claim 1 wherein said body further comprises two ports and wherein said ports are disposed on opposed sides of said capillary section, whereby a first port is in communication with said exhaust gas upstream of said capillary section and a second port is in fluid communication with said exhaust gas downstream of said capillary section, and wherein said pressure differential sensor senses the pressure differential across said ports.

7. The apparatus according to claim 1 wherein said capillary section is comprised of ceramic material.

8. The apparatus according to claim 2 wherein each capillary tube is generally square in cross section.

9. The apparatus according to claim 6 and further comprising a further pressure sensor positioned in fluid communication with said first port, and wherein said further pressure sensor outputs at least one signal representative of pressure of said exhaust gas upstream of said capillary section, whereby the exhaust gas flowrate is enabled to be calculated using said pressure signal.

10. The apparatus according to claim 9 wherein said memory has stored therein calibration constants and wherein said computer calculates the pressure differential across said capillary section ($\Delta P$) corresponding to a flow rate of said exhaust gas according to the formula:

$$\frac{\Delta P}{Q\mu} = A + B\left(\frac{\rho Q}{\mu}\right) + C\left(\frac{\rho Q}{\mu}\right)^2$$

wherein

Q corresponds to a known flow rate $\mu$ corresponding with said calculated viscosity value $\rho$ corresponds with said calculated density value and wherein A, B, and C are calibration constants stored in said memory.

11. The apparatus according to claim 9 wherein said memory has stored therein calibration coefficients and wherein said computer calculates the flowrate (Q) of said exhaust gas according to the formula:

$$\frac{Q\mu}{\Delta P} = A + B\left(\frac{\rho\Delta P}{\mu^2}\right) + C\left(\frac{\rho\Delta P}{\mu^2}\right)^2 + D\left(\frac{\rho\Delta P}{\mu^2}\right)^3$$

wherein $\Delta P$ corresponds with said pressure reduction signal $\mu$ corresponds with said calculated viscosity valve $\rho$ corresponds with said calculated density valve and wherein A, B, C and D are calibration constants stored in said memory.

12. The apparatus according to claim 1 wherein said capillary tubes have a hydraulic diameter of generally about 1.27 millimeters.

13. The apparatus according to claim 1 and further comprising a heating element, wherein said heating element is in operative connection with said engine, and wherein said heating element is operative to heat said capillary section above a dewpoint temperature of said exhaust gas prior to the start of said engine.

14. The apparatus according to claim 9 and further comprising a heating element, wherein said heating element is in operative connection with said engine, and wherein said heating element is operative to heat said capillary section above a dewpoint temperature of said exhaust gas prior to the start of said engine.

15. The apparatus according to claim 9 and further comprising a heating element, wherein said heating element is in operative connection with said engine, and wherein said heating element is operative to heat said capillary section above a dewpoint temperature of said exhaust gas prior to the start of said engine.

16. The apparatus according to claim 13 wherein said heating element is in operative connection with said computer and wherein said temperature of said heating element is controlled in response to said exhaust gas composition data stored in said memory.

17. The apparatus according to claim 15 wherein said heating element is in operative connection with said computer and wherein said temperature of said heating element is controlled in response to said exhaust gas composition data stored in said memory.

18. The apparatus according to claim 13 and wherein said heating element is in operative connection with said computer, and wherein said computer is operative to shut off said heating element responsive to said temperature sensor signal exceeding a set value.

19. The apparatus according to claim 15 and wherein said heating element is in operative connection with said computer, and wherein said computer is operative to shut off said heating element responsive to said temperature sensor signal exceeding a set value.

20. The apparatus according to claim 19 wherein said set value is set responsive to said exhaust gas composition data stored in said memory.

21. The apparatus according to claim 15 wherein said computer is in operative connection with said heating element, and wherein said computer is operative to heat said capillary section prior to enabling the start of said engine.

22. The apparatus according to claim 21 wherein said computer is further operative to shut down said heating element responsive to said temperature sensor sensing an exhaust gas temperature above a temperature produced by said heating element.

23. The apparatus according to claim 15 wherein said heating element extends in surrounding relation of said capillary section.

24. A method for measuring the volumetric flowrate of exhaust gas from an internal combustion engine comprising the steps of:

placing a laminar flow element in fluid communication with an exhaust conduit of said engine, wherein said laminar flow element comprises a body, and a capillary section located within said body, wherein said exhaust gas flows therethrough, placing a pressure differential sensor in fluid communication with said laminar flow element at both an upstream side of said capillary section and at a downstream side of said capillary section, and generating at least one signal with said pressure differential sensor, said signal representative of the pressure difference in the exhaust gas on said sides of said capillary section, placing an absolute pressure sensor in fluid communication with said laminar flow element on said upstream side of said capillary section, and generating at least one signal with said absolute pressure sensor, said signal representative of the pressure of said exhaust on said upstream side of said capillary section, placing a temperature sensor in operative connection with said exhaust gas flowing through said laminar flow element, and generating at least one signal with said temperature sensor, said signal representative of said exhaust gas temperature;

starting said engine, calculating with a computer said exhaust gas flowrate as a function of at least one of said signals;

starting a timer when said engine is started, and generating a signal representative of the elapsed time from said starting step;

sampling with said computer said time signal at predesignated times while said engine is running, wherein said calculating step is repeated at each predesignated time, wherein said computer has a memory in connection therewith, and wherein said memory has stored therein exhaust gas composition data, and wherein in said calculating step said computer calculates said exhaust gas flow rate as a function of at least said one of said signals and said composition date.

25. A method according to claim 24 further comprising the step of:

heating said laminar flow element with a heater to above a dewpoint temperature of said exhaust gas before said starting step.

26. A method according to claim 24 wherein said pressure differential signal, said absolute pressure signal, said temperature signal and said timer signal are received by said computer, wherein said computer in operatively connected with a memory, wherein during said sampling steps all signals are sent to said computer and recorded in said memory, and wherein in said calculating step, said computer calculates the exhaust flowrate for each predesignated time.

27. A method according to claim 26 further comprising the step of:

heating said laminar flow element with a heater to above the dewpoint of said exhaust before said starting step.

28. A method for determining an exhaust gas flowrate from an internal combustion engine, comprising the steps of:

passing exhaust gas from an internal combustion engine through a laminar flow element having a capillary section, wherein said exhaust gas is in a laminar flow condition;

sensing with a differential pressure sensor a pressure drop for said exhaust gas passing through said capillary section;

generating at least one differential pressure signal responsive to said pressure drop;

sensing temperature of said exhaust gas adjacent said capillary section and generating at least one temperature signal responsive to said temperature;

sensing absolute pressure on an upstream side of said capillary section and generating at least one absolute pressure signal corresponding to said absolute pressure; and calculating said exhaust gas flowrate with a computer, wherein said computer is in operative connection with a memory and wherein said memory has stored therein exhaust gas composition data as a function of time from an engine start, and wherein said passing step commences with the start of said engine, and further comprising starting an elapsed timer at said engine start, and calculating with said computer values corresponding to viscosity and density of said exhaust gas responsive to said temperature signal, said absolute pressure signal and said exhaust gas composition data in said memory, wherein said computer calculates said exhaust gas flowrate responsive to said calculated viscosity and density values and said differential pressure signal.

29. The method according to claim 28 and further comprising the step of:

preheating said laminar flow element with a heater to an elevated temperature prior to passing said exhaust gas through said laminar flow element.

30. The method according to claim 29 and further comprising the step of sensing the temperature of said exhaust gas adjacent said laminar flow element with a temperature sensor and shutting off said heater when said exhaust gas temperature reaches said elevated temperature.

31. The method according to claim 29 wherein said passing of said exhaust gas through said element is initiated upon a start of said engine and further comprising the step of preventing the start of said engine until said laminar flow element is at said elevated temperature.

32. The method according to claim 29 wherein said computer is in connection with a memory and wherein said memory stores data representative of exhaust gas composition subsequent to an engine start, and wherein said passing of gas through said laminar flow element is initiated by the start of the engine and wherein in said preheating step said elevated temperature is controlled by said computer responsive to a dewpoint of said exhaust gas subsequent to said engine start determined from said composition data stored in said memory.

33. The method according to claim 32 and further comprising the step of:

sensing with a temperature sensing means a temperature of said exhaust gas adjacent said laminar flow element and generating at least one temperature signal representative of said temperature sensed; and starting an elapsed timer upon starting of said engine;
and wherein said exhaust gas composition data is stored in said memory as a function of time from engine start, and further comprising controlling said heater with said computer responsive to said temperature signal, elapsed time and exhaust gas composition data.

* * * * *